United States Patent [19]

Rivest

[11] 4,376,299

[45] Mar. 8, 1983

[54] DATA CENTER FOR REMOTE POSTAGE METER RECHARGING SYSTEM HAVING PHYSICALLY SECURE ENCRYPTING APPARATUS AND EMPLOYING ENCRYPTED SEED NUMBER SIGNALS

[75] Inventor: Ronald L. Rivest, Belmont, Mass.

[73] Assignee: Pitney Bowes, Inc., Stamford, Conn.

[21] Appl. No.: 168,931

[22] Filed: Jul. 14, 1980

[51] Int. Cl.³ ............ H04L 9/00

[52] U.S. Cl. ............ 364/900; 178/22.08

[58] Field of Search ............ 364/900 MS File; 340/825.3; 375/2.1; 178/22.01, 22.08, 22.09, 22.18, 22.19

[56] References Cited

U.S. PATENT DOCUMENTS

| | | | |
|---|---|---|---|
| 3,034,329 | 5/1962 | Pitney et al. | 70/314 |
| 3,664,231 | 5/1972 | Hanson | 70/292 |
| 3,800,284 | 3/1974 | Zucker et al. | 340/825.31 |
| 3,978,457 | 8/1976 | Check, Jr. et al. | 364/200 |
| 4,097,923 | 6/1978 | Eckert, Jr. et al. | 364/900 |
| 4,182,933 | 11/1980 | Rosenblum | 178/22.09 X |
| 4,253,158 | 2/1981 | McFiggins | 178/22.01 X |

FOREIGN PATENT DOCUMENTS 2636852 2/1978 Fed. Rep. of Germany .

*Primary Examiner*—Raulfe B. Zache

*Attorney, Agent, or Firm*—David E. Pitchenik; Mr. W. D. Soltow, Jr.; Albert W. Scribner

[57] ABSTRACT

A data center for remote postage meter recharging receives resetting signal information to reset a remotely located postage meter. The remotely located postage meter has signal information stored therein for use in recharging the meter with additional postage in conjunction with a signal information received from the data center and entered into the meter. The data center includes a sealed unit for processing received resetting signal information and encrypted signal information stored at the data center outside of the sealed unit. The stored encrypted signal information at the data center is equivalent to the signal information stored in the remotely located postage meter. The sealed unit includes a decrypter for decrypting the encrypted signal information so that it may be combined with the resetting signal information to generate a signal for use in resetting the remotely located postage meter. The sealed unit also includes an encrypter for encrypting information to provide updated encrypted signal information to be stored at the data center outside of the sealed unit for use when the remotely located postage meter is again to be reset with additional postage.

12 Claims, 4 Drawing Figures

40

DATA CENTER FOR REMOTE POSTAGE METER RECHARGING SYSTEM HAVING PHYSICALLY SECURE ENCRYPTING APPARATUS AND EMPLOYING ENCRYPTED SEED NUMBER SIGNALS

FIELD OF THE INVENTION

The present invention relates to data centers for remote postage meter recharging. More particularly, the invention relates to a remote postage meter recharging system data center having a physically secure encrypting apparatus and employing encrypted seed number signals.

BACKGROUND OF THE INVENTION

Postage meters are devices for dispensing value in the form of postage printed on a mail piece such as an envelope. The term postage meter also includes other similar meters such as parcel post meters. Meters of this type print and account for postage stored within the meter. Since representations of postage available for printing are stored in the meter, the postage meter must be provided with safeguards against tampering.

Within the above requirement, systems have been developed to enable postage meters to be recharged or reset with additional postage for printing by the meter without the need to physically carry the postage meter to the postal authorities for resetting. This avoids the inconvenience to the users of the postage metered mailing system by avoiding the necessity to bring the meters to the postal service for recharging. The remote recharging systems have met the requirement for security for the postage meters and have been developed for both fixed increment resetting for mechanical meters and variable increment resetting for electronic meters.

In the mechanical resetting meters, the system is equipped with a combination lock whose combination changes in a predetermined random sequence (often referred to as puedo-random sequence) each time it is actuated. The combination lock operates on the resetting mechanism of the postage meter such that, when unlocked, the mechanism may be manipulated to recharge the meter with a postage increment. As the meter is recharged, the combination lock automatically locks itself to prevent subsequent recharging of the meter unless and until the correct new and different combination is entered. Combination locks of this type, suitable for your use in postage meters are disclosed in U.S. Pat. No. 3,034,329 entitled Combination Lock Device and U.S. Pat. No. 3,664,231 entitled Locking Device.

The remote meter resetting system may also be incorpoated in electronic postage meters such as described in U.S. Pat. No. 4,097,923 for REMOTE POSTAGE RECHARGING SYSTEM USING AN ADVANCED MICROCOMPUTERIZED POSTAGE METER. The resetting systems involves a data center which may be equipped with a voice answer back unit. The data center processes telephone calls from the postage meter users, requiring the transmission by the user of information unique to the particular meter being reset. The information is used to verify the authenticity caller and to update the record of the user stored at the data center.

The postage meter user informs the data center of the postage which is desired to be funded into the meter. The postage amount requested for resetting may be varied according to the requirement of the user. The computer at the data center formulates a combination based on the identifying information and the amount of postage requested for resetting. This combination is then transmitted back to the user. The user enters both the amount and the combination into the postage meter. The postage meters contains circuitry for comparing the entered combination with an internally generated combination based upon the amount of postage requested for resetting and the identifying information. If the entered combination matches the internally generated combination, the funding registers of the meter are increased by the new postage amount.

A system disclosed in copending U.S. patent application Ser. No. 024,813 filed Mar. 28, 1979, now U.S. Pat. No. 4,253,158 for Robert B. McFiggans and entitled SYSTEM FOR SECURING POSTAGE PRINTING TRANSACTIONS employs encrypters at both a printing station and an accounting station interconnected through an insecure communications links. Each time the meter is tripped, a number generator at the printing station is activated to generate a number signal which is encrypted to provide an unpredictable result. The number signal is also transmitted to the accounting station. At the accounting station, the postage to be printed is accounted for and the number signal is encrypted to provide a replay signal. The reply signal is transmitted to the printing station where a comparator compares it with the encryption results generated at the printing station. An equality of the encryption result and the reply signal indicates that the postage to be printed has been accounted for and the printer is activated.

Although the above systems operate quite satisfactorily for their intended purpose, it has been a constant desire to enhance the security of the postage meter remote recharging systems and to provide improved performance. This is particularly so with variable increment resetting which requires a more secure and more complex environment than fixed increment systems. The reasons for this are that the amounts which may be involved in a reset can be substantially larger than with fixed systems where the amount is established in advance.

It has been a constant desire to enhance the security for remote postage meter resetting systems. A system for enhancing the security of a remotely resettable postage meter is described in a concurrently filed patent application filed for Edward C. Duwell and Howell A. Jones, Jr, entitled IMPROVED POSTAGE METER RECHARGING SYSTEM, Ser. No. 168,932 and assigned to the present assignee. The disclosure of said concurrently filed patent application is hereby incorporated by reference. In this connection, various security measures have been implemented at the data center to protect the information stored in the data center's records. To this end, physical security has been provided to limit the number of people who may enter the data center and to limit the access to the particular information within the data center. These systems provide a high level of security. It is desired, however, to further increase the level of security at the postage meter recharging system data centers.

SUMMARY OF THE INVENTION

A data center is provided which insures that the data center personnel are isolated from access to information necessary to reset or recharge a remotely resettable postage meter. A portion of the apparatus at the data center is physically secure in a manner which precludes data center personnel from access to certain portions of the apparatus while enabling the data center personnel access to information necessary to operate the center. The unit may be sealed by a special secure enclosure, by being located physically remote from the data center, by being locked in a special secure room, or by other suitable techniques.

A data center for remote postage meter recharging includes means for receiving resetting signal information. Means are coupled to the receiving means for processing the resetting signal information. Means are provided for storing encrypted signal information. A sealed unit means is coupled to the processing means and to the encrypted signal storage means. The sealed unit means generate a signal for use in resetting a postage meter.

BRIEF DESCRIPTION OF THE DRAWINGS

A complete understanding of the present invention may be obtained by reference to the following detailed description and to the drawings, wherein like reference numerals are used to describe similar components in the various figures and in which.

DETAILED DESCRIPTION

Figure 1:
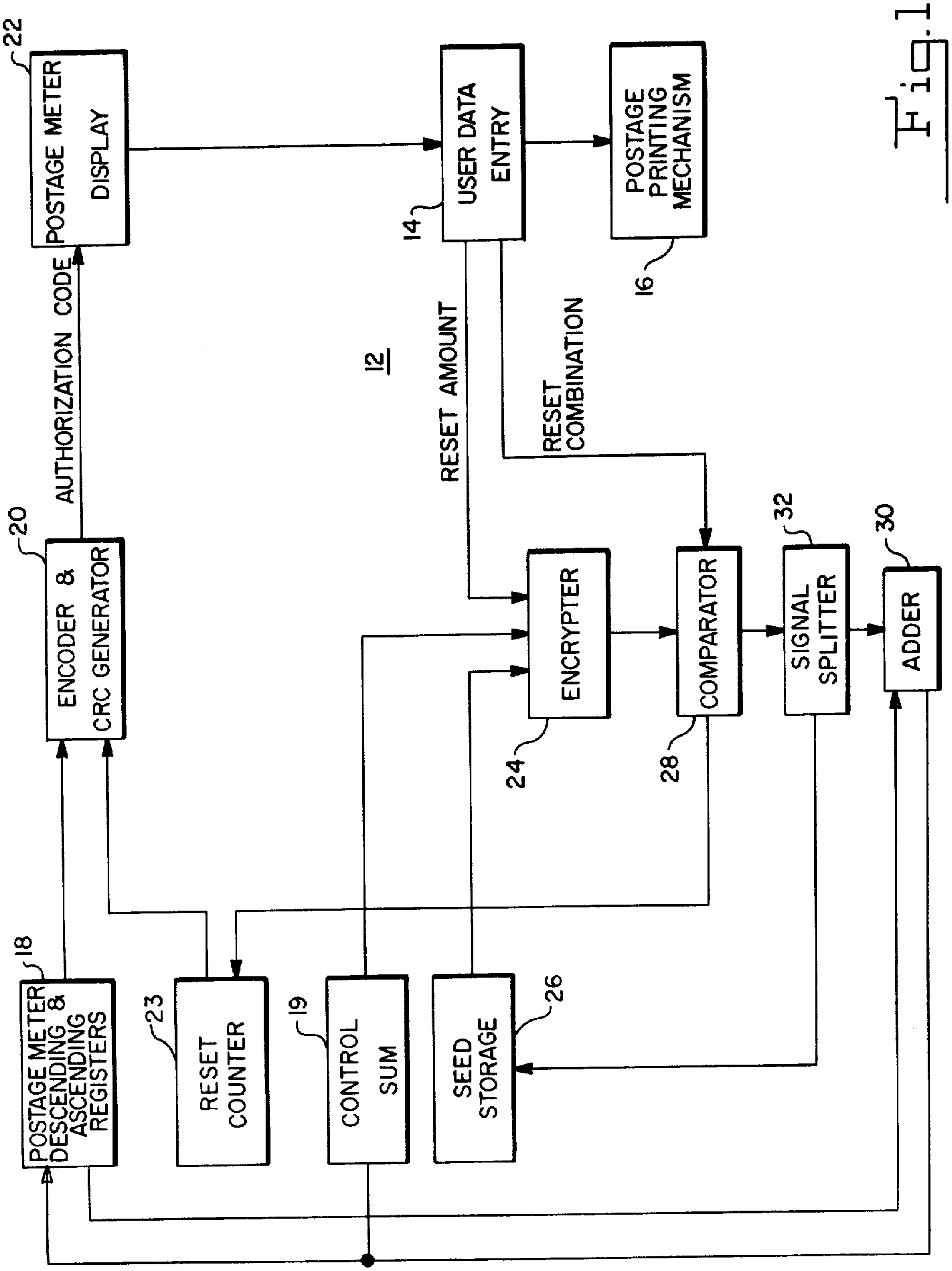
FIG. 1 is a block diagram of a postage meter embodying present invention.

Reference is now made to FIG. 1. A postage meter 12 includes a user data entry means 14 such as a keyboard for entering postage to be printed by a postage printing mechanism 16. The postage meter 12 may be of the type disclosed in U.S. Pat. No. 3,978,457 entitled MICROCOMPUTERIZED ELECTRONIC POSTAGE METER or in copending U.S. patent application Ser. No. 89,413 filed Oct. 30, 1979 now U.S. Pat. No. 4,301,507 for ELECTRONIC POSTAGE METER HAVING PLURAL COMPUTING SYSTEMS. The postage meter 12 includes register 18 for accounting for postage stored in the meter and for other postage accounting information. Such information may include, the total amount of postage printed by the meter (an ascending register) the total amount of postage remaining in the meter for printing (a descending register) and the sum of the ascending register and the descending register (a control sum register). The control sum register amount remains fixed for a postage meter unless and until the descending register is charged with additional postage.

Register 18 is coupled to an encoder and cyclical redundancy character generator 20 as is a reset counter 23. The encoder and cyclical redundancy character generator operates upon the information from register 18 and from the reset counter 23 to generate an authorization code, the authorization code may be displayed on the postage meter display 22. The authorization code is utilized in conjunction with the remote meter resetting of postage meter 12 in communications with a data center, the data center may be accessed by a postage meter user over insecure communications link such as a telephone line.

The authorization code provides a level of assurance that the postage meter user calling the data center has physical access to the meter being reset and also that the information has been accurately transferred between the meter and the data center. The encoder and CRC generator 20 are of the type which process input information to provide a detection scheme for errors which may occur in transferring information.

When the postage meter 12 is to be recharged with postage, a reset amount is entered by the postage meter user at the data entry station 14. The reset amount is applied to an encrypter 24. Additionally, applied to the encryptor 24 is information from the control sum register 19, and a prestored seed number signal from seed storage 26. The seed number signal is stored in the meter 12 in an unencrypted form. Encrypter 24 can be any one of a large number of encrypting devices including those devices which use the Data Encryption Standards described in FIPS PUB 46, dated Jan. 15, 1977 and published by the U.S. Department of Commerce, National Bureau of Standards. Encrypter 24 generates an encrypted signal based upon the user entered reset amount, the information from the control sum register 18 and the seed number signal from seed storage register 26. Output signal from encryptor 24 is applied to a comparator 28. Comparator 28 compares the signal generated by the encryptor 24 with a user entered signal or combination.

If the comparator 28 determines that a user entered combination coincides with the combination generated by encrypter 24, the reset amount signal is applied, with the current descending register amount signal from register 18 to an adder 30. The reset amount is applied to increment the descending register and the control sum register.

Figure 2:
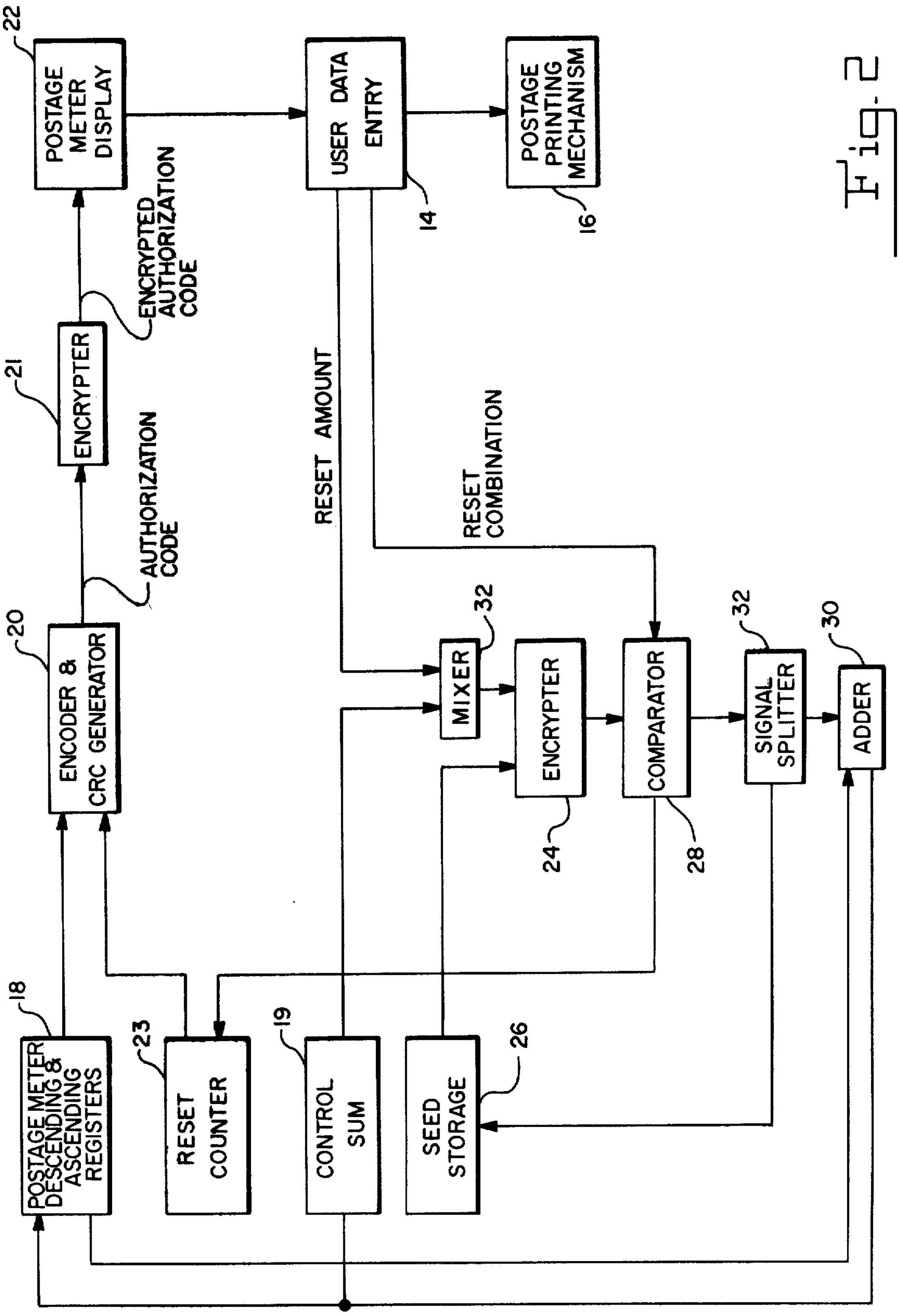
FIG. 2 is a block diagram of a postage meter in accordance with FIG. 1 including a second encrypter and mixer to enhance the security of the system.

It should be noted that in accordance with the embodiment shown in FIG. 2 the reset amount and the control sum may be first applied to a mixer circuit 32 before being applied to the encrypter 24. The mixer 32 provides additional security for the postage meter. The mixer provides a mixed input signal to the encrypter 24 such that the determination of the output signal from the encrypter 32 is more difficult to determine.

Referring again to FIG. 1, a successful comparison of a user entered combination and a combination generated in encrypter 24 results in a new clear text seed number signal being stored in the seed storage register 26 for the next reset activity.

Additionally, the reset counter 23 is incremented. The reset counter 23 may be one of many types including a modulo 2 or modulo 16 counter. The counter 23 provides an input signal to the encoder and CRC generator 20 such that the authorization code signal contains information as to whether the postage meter 12 has been successfully reset. The reset counter 23 is incremented by an output signal from the comparator 28 only when a successful comparison of the user entered reset combination signal and the internally meter generated reset combination signal occurs.

The output signal from the comparator 28 is applied to a signal splitter 32. The separator 32 extracts a new seed number signal from the generated cypher-text. The new seed number is stored in the seed register and the reset amount is applied to the adder 30.

Figure 3:
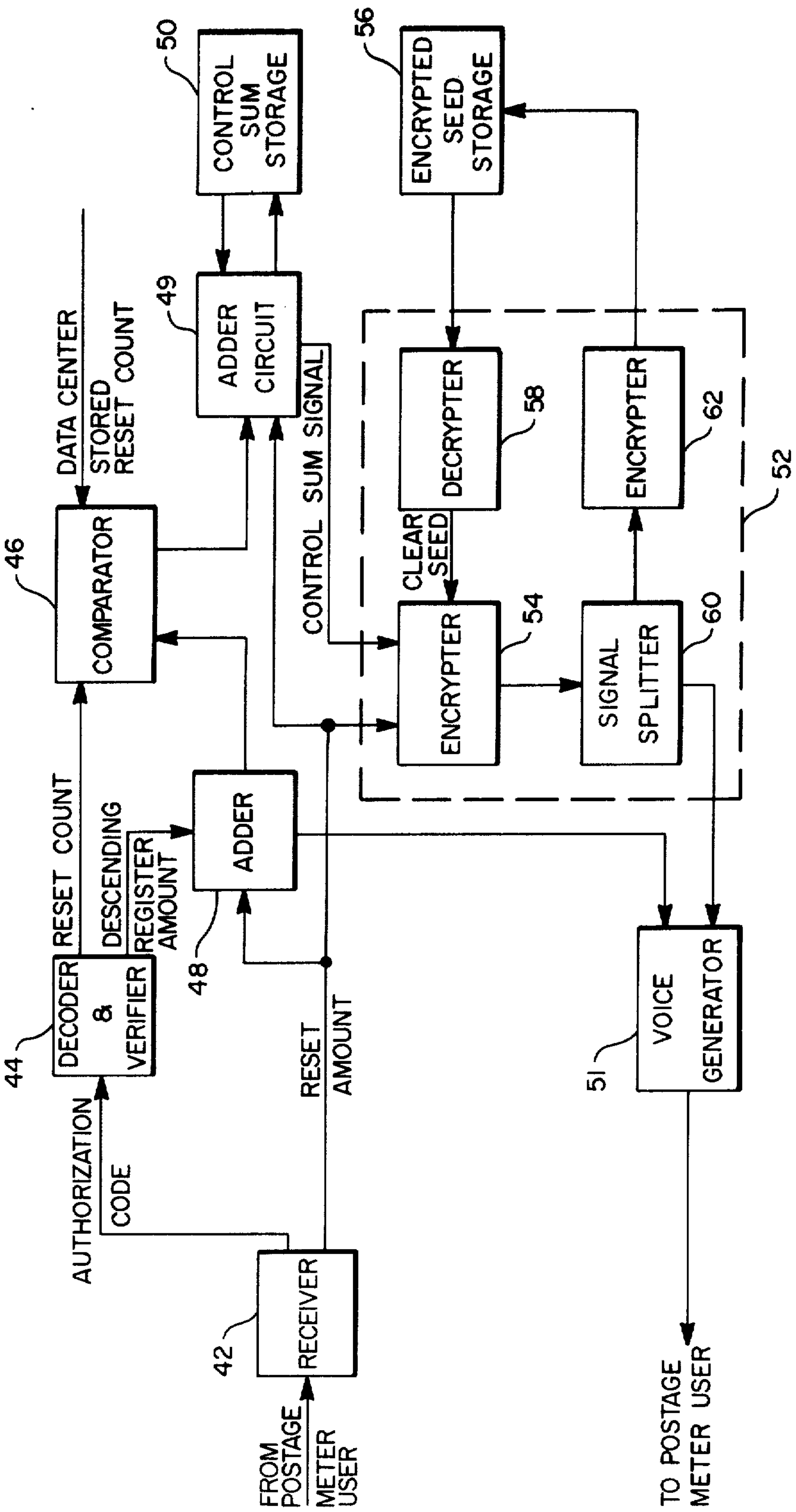
FIG. 3 is a block diagram of a data center suitable to be used in cooperation with the postage meter shown in FIG. 1.

Reference is now made to FIG. 3 which is a block diagram of a remote data center operable in conjunction with the remote settable meter 12 shown in FIG. 1. The data center 40 receives the authorization code generated by postage meter 12 and transmitted by the user such as by use of a tone generator type telephone. The authorization code is applied via a receiver 42 to a decoder and verifier 44.

The decoder and verifier 44 decodes the authorization code to generate the reset count and, for example, the descending register amount for postage meter 12. The decoder further verifies the CRC to insure that the data has been accurately transmitted and additionally to provide a level of verification that the user has had physical access to the meter being reset. This is because a user who determines the reset count and the descending register amount for a particular meter would not, have sufficient information to access the data center; still needing to determine the signal processing in the encoder and CRC generator.

Figure 4:
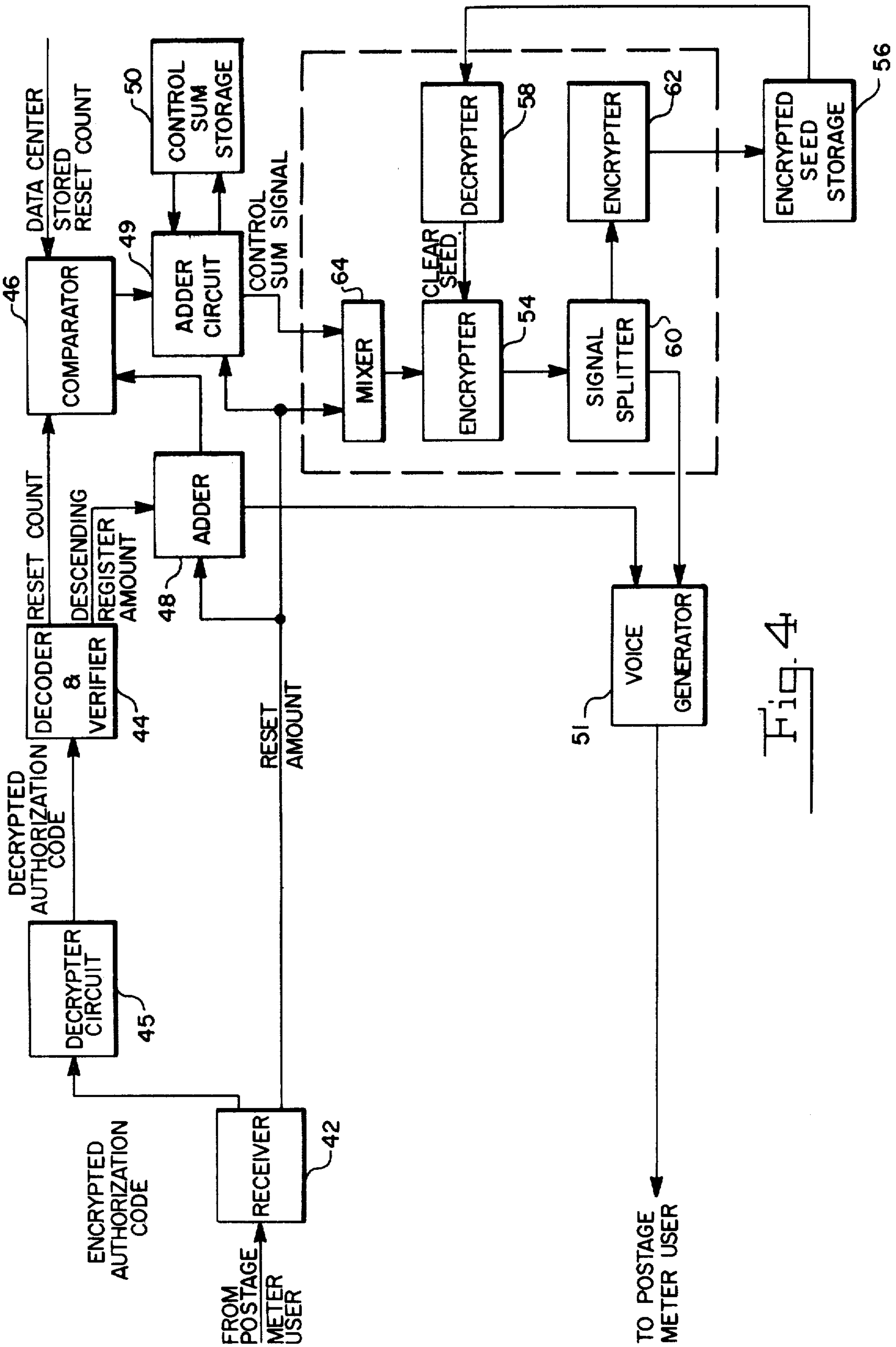
FIG. 4 is a block diagram of a data center suitable to be used in cooperation with the postage meter shown in Fig. 2.

It should be noted that further security can be provided by applying the authorization code to an encrypter 21 (FIG. 2) prior to display on the postage meter display 22 and thus, prior transmission by the postage meter user. If this occurs, the encrypted authorization code, as is shown in FIG. 4, would be decrypted in a decryption circuit 46.

Referring again to FIG. 3, if the decoder and verifier 44 verifies the accuracy of the transmission (the CRC is correct), the reset count signal is generated and applied to a comparator 46 wherein the decoded reset count signal is compared to the reset count signal stored at the data center. The decoded descending register amount signal is applied to an adder 49 with the reset amount signal from receiver 42 which is also provided to the data center by the user. If the sum of the descending register and reset amount exceeds the amount of postage capable of being stored in the postage meter, the reset operation is inhibited. This information may be communicated back to the user via a voice generating means 51.

If the stored reset count signal and the decoded reset count signal compare correctly, the comparator 46 enables an adder circuit 49 coupled to the control sum storage register 50 to provide the current control sum associated with postage meter 12 to a physically sealed unit 52 and to add the reset amount to the control sum storage register. The physically sealed unit 52 is sealed in a manner to prevent access to the circuitry by data center personnel. The sealed unit, which will be described in greater detail hereinafter, results in an enhanced security for the remote meter resetting system because the data center personnel do not have access to the encryption circuit and certain unencrypted data associated with the resetting of the meter 12.

The control sum register 50 signal is applied to an encrypter 54 within sealed unit 52 as is the user entered reset amount signal from receiver 42. Additionally applied to the encrypter 54 are unencrypted seed number signals. The encrypter 54 may be any one of a large number of encrypting devices such as those employing the data encryption standard previously identified. However, it should be noted that encryption device 54 is identical in its operation to the encryption device 24 in postage meter 12.

The seed number signal applied to the encrypter 54 is stored in the data center so that it may be accessible by data center personnel. However, the seed number signal is stored in an encrypted form in encrypted seed storage 56. This is the only form of the seed signal to which data center personnel have access. The encrypted seed signal from storage 56 is applied to a decryption device 58 which need not be similar to or compatible with the form of encryption provided by encrypter 54 and encryptor 24 in the postage meter 12. The decryption device 58 which again may be any one of the large number of devices functions to decrypt the encrypted seed number signal and to provide an unencrypted, clear seed number signal which is the same as the seed number signal stored in the seed storate 26 postage meter 12. The encrypter 54 generates an encrypted output signal which is applied to a signal splitter circuit 60. The splitter circuit 60 splits the encrypted output signal from encrypter 54 into a first part which is transmitted via the voice generator means 51 to the postage meter user. The voice transmitted combination is the combination which is entered by the user and applied to the comparator 28 in FIG. 1.

The splitter circuit 60 additionally applies part of the encrypted output signal from encryptor 54 to a second encrypter 62 to generate a new encrypted seed number signal. Encrypter 62 encrypts the seed number signal in a manner so that it is compatible with the decryptor 58. The new encrypted seed number signal for postage meter 12 is transmitted from within the sealed unit 12 to the encrypted seed storage 56 which is accessible to the data center personnel.

Reference is now made to FIG. 4 which shows the use of a mixer 64 located within the sealed unit 52. In this embodiment, the mixer 64 provides a further enhanced security, similar to mixer 30 provided in postage meter 12. If a mixer 30 is provided in the postage meter 12, a like mixer 64 must be provided at the data center.

What is claimed is:

1. A data center for a remote postage meter recharging system of the type adapted recharge remotely located postage meters, each of said postage meters having signal information stored therein for use in recharging said postage meter with additional postage, comprising:
   - means for receiving resetting signal information associated with a selected one of said remotely located postage meters;
   - means coupled to said receiving means for processing said resetting information;
   - means for storing encrypted signal information equivalent to said signal information stored in each of said postage meters; and
   - sealed unit means coupled to said resetting signal information processing means and to said means for storing encrypted signal information for processing received resetting signal information and stored encrypted signal information to generate a signal for use in resetting said selected one of said remotely located meters.

2. A data center for a remote postage meter recharging system as defined in claim 1 wherein said sealed unit means includes a first encrypter coupled to said means for processing said resetting information.

3. A data center for a remote postage meter recharging system, comprising:
   - means for receiving resetting signal information;
   - means coupled to said receiving means for processing said resetting information;
   - means for storing encrypted signal information; and sealed unit means coupled to said resetting signal information processing means and to said means for storing encrypted signal information for processing received resetting signal information and stored encrypted signal information to generate a signal for use in resetting a remotely located postage meter, said sealed unit means including a first encrypter coupled to said means for processing said resetting information, and a decrypter coupled between said means for storing encrypted signal information and said first encrypter.

4. A data center for a remote postage meter recharging system as defined in claim 3 further including a second encrypter coupled between said first encrypter and said means for storing encrypted signal information.

5. A data center for a remote postage meter recharging system as defined in claim 4 further including signal splitter means coupled between said first and said second encrypter.

6. A data center for a remote postage meter recharging system as defined in claim 5 further including mixing means coupled between said means for processing resetting information and said first encrypter.

7. A data center for a remote postage meter recharging system, comprising:

means for processing resetting signal information;

means for storing encrypted signal information equivalent to signal information stored in a remotely located postage meter; and sealed unit means coupled to said resetting signal information processing means and to said means for storing encrypted signal information for generating a signal for use in resetting said remotely located postage meter, said sealed unit means including a first encrypter coupled to said means for processing said resetting signal information, a decrypter coupled between said means for storing encrypted signal information and said first encrypter, and a second encrypter coupled between said first encrypter and said means for storing encrypted signal information.

8. A data center for a remote postage meter recharging system as defined in claim 7 further including signal splitter means coupled between said first and said second encrypter.

9. A data center for a remote postage meter recharging system as defined in claim 8 further including mixing means coupled between said means for processing resetting signal information and said first encrypter means.

10. A data center for remote postage meter recharging systems, comprising:

means for receiving resetting signal information;

means coupled to said receiving means for processing said resetting signal information;

means for storing encrypted signal information, said encrypted signal information being associated with a particular postage meter to be reset;

sealed unit means coupled to said resetting information processing means and to said means for storing encrypted signal information for decrypting said encrypted signal information to generate signal information equivalent to signal information stored in said postage meter to be reset said sealed unit further including a circuit means coupled to said decrypting means for generating a signal for use in resetting said associated postage meter; and means, external to said sealed unit means and coupled thereto, adapted to receive said signal generated in said sealed unit for use in resetting a postage meter.

11. A data center defined in claim 10, wherein said circuit means in said sealed unit is a first encrypter for encrypting said information from said means processing said resetting information.

12. A data center as defined in claim 11, including signal splitter means coupled to said encrypter, said signal splitter means further coupled to a second encrypter and to said means external to said sealed unit, said second encrypter encrypting a portion of the signal from said signal splitter and for applying said encrypted portion to said means for storing encrypted signal information.

* * * * *